(12) United States Patent
Tanaka et al.

(10) Patent No.: US 10,611,900 B2
(45) Date of Patent: Apr. 7, 2020

(54) AQUEOUS RESIN COMPOSITION AND GLOVE

(71) Applicant: DIC Corporation, Tokyo (JP)

(72) Inventors: Hiroki Tanaka, Osaka (JP); Norie Fujishita, Osaka (JP); Miwa Ueguchi, Osaka (JP)

(73) Assignee: DIC Corporation, Tokyo (JP)

( * ) Notice: Subject to any disclaimer, the term of this patent is extended or adjusted under 35 U.S.C. 154(b) by 18 days.

(21) Appl. No.: 16/062,470

(22) PCT Filed: Nov. 10, 2016

(86) PCT No.: PCT/JP2016/083345
§ 371 (c)(1),
(2) Date: Jun. 14, 2018

(87) PCT Pub. No.: WO2017/104315
PCT Pub. Date: Jun. 22, 2017

(65) Prior Publication Data
US 2018/0371215 A1    Dec. 27, 2018

(30) Foreign Application Priority Data
Dec. 15, 2015 (JP) .................. 2015-244153

(51) Int. Cl.
| | |
|---|---|
| C08L 9/02 | (2006.01) |
| C08G 18/76 | (2006.01) |
| C09D 175/08 | (2006.01) |
| C09D 109/02 | (2006.01) |
| C08G 18/66 | (2006.01) |
| A41D 19/00 | (2006.01) |
| C08G 18/32 | (2006.01) |
| C08G 18/34 | (2006.01) |
| C08G 18/48 | (2006.01) |
| C08J 5/18 | (2006.01) |
| C08K 3/06 | (2006.01) |
| C08K 3/22 | (2006.01) |
| C08K 5/205 | (2006.01) |

(52) U.S. Cl.
CPC ............ *C08L 9/02* (2013.01); *A41D 19/0055* (2013.01); *C08G 18/3206* (2013.01); *C08G 18/348* (2013.01); *C08G 18/4858* (2013.01); *C08G 18/6674* (2013.01); *C08G 18/7621* (2013.01); *C08G 18/7657* (2013.01); *C08G 18/7671* (2013.01); *C08J 5/18* (2013.01); *C08K 3/06* (2013.01); *C08K 3/22* (2013.01); *C08K 5/205* (2013.01); *C09D 109/02* (2013.01); *C09D 175/08* (2013.01); *C08K 2003/2296* (2013.01)

(58) Field of Classification Search
USPC ...................................................... 525/123
See application file for complete search history.

(56) References Cited

FOREIGN PATENT DOCUMENTS

| | | |
|---|---|---|
| JP | H08-209415 A | 8/1996 |
| JP | H09-087972 A | 3/1997 |
| JP | H10-082465 | 3/1998 |
| WO | 2013/035461 A1 | 3/2013 |

OTHER PUBLICATIONS

Search Report issued in corresponding International Patent Application No. PCT/JP2016/083345, dated Jan. 31, 2017.

*Primary Examiner* — Terressa Boykin
(74) *Attorney, Agent, or Firm* — McDermott Will & Emery LLP

(57) ABSTRACT

To provide an aqueous resin composition including: an anionic polyurethane (A) having an aromatic ring; an acrylonitrile butadiene rubber (B); an aqueous medium (C); a vulcanizing agent (D); and a vulcanizing accelerator (E). The anionic polyurethane (A) is preferably a product of reaction of polyoxytetramethylene glycol, a carboxyl group-containing glycol, ethylene glycol, and diphenylmethane diisocyanate, or a product of reaction of polyoxytetramethylene glycol, a carboxyl group-containing glycol, butanediol, and diphenylmethane diisocyanate. An object of the invention is to provide a mixture of aqueous polyurethane and NBR having excellent storage stability, even in a case where the vulcanizing agent and the vulcanizing accelerator are added.

7 Claims, No Drawings

AQUEOUS RESIN COMPOSITION AND GLOVE

CROSS REFERENCE

This application is the U.S. National Phase under 35 U.S.C. § 371 of International Application No. PCT/JP2016/083345, filed on Nov. 10, 2016, which claims the benefit of Japanese Application No. 2015-244153, filed on Dec. 15, 2015, the entire contents of each are hereby incorporated by reference.

TECHNICAL FIELD

The present invention relates to an aqueous resin composition having excellent storage stability.

BACKGROUND ART

From the related art, natural rubber, synthetic rubber latex, and the like have been used for gloves. The manufacturing a coating film of a glove with an aqueous resin composition blended with aqueous polyurethane has been also studied for modifying these rubbers (for example, see PTL 1).

Recently, the blending of aqueous polyurethane may be performed for improving flexibility and wear resistance of acrylonitrile butadiene rubber. At this time, it is general to add a vulcanizing agent or a vulcanizing accelerator, however, it is found that, in a case where these are added to a blended material of aqueous polyurethane and acrylonitrile butadiene rubber, thickening or solidification occurs over time, and storage stability is deteriorated.

CITATION LIST

Patent Literature

[PTL 1] JP-A-08-209415

SUMMARY OF INVENTION

Technical Problem

An object of the invention is to provide a mixture of aqueous polyurethane and acrylonitrile butadiene rubber having excellent storage stability, even in a case where a vulcanizing agent and a vulcanizing accelerator are added.

Solution to Problem

The invention provides an aqueous resin composition including an anionic polyurethane (A) having an aromatic ring, an acrylonitrile butadiene rubber (B), an aqueous medium (C), a vulcanizing agent (D), and a vulcanizing accelerator (E).

The invention further provides a glove including a coating film produced by solidifying the aqueous resin composition.

Advantageous Effects of Invention

The aqueous resin composition of the invention has excellent storage stability. In addition, in a case of using the anionic polyurethane (A) having a specific composition, excellent wear resistance and flexibility are obtained, in addition to the storage stability which is the object of the invention. Therefore, the aqueous resin composition of the invention can be suitably used for manufacturing a glove, a medical tube such as a catheter, or a contraceptive such as a condom, and can be, particularly, suitably used for manufacturing a glove.

DESCRIPTION OF EMBODIMENTS

An aqueous resin composition of the invention includes an anionic polyurethane (A) having an aromatic ring, an acrylonitrile butadiene rubber (B), an aqueous medium (C), a vulcanizing agent (D), and a vulcanizing accelerator (E).

The anionic polyurethane (A) necessarily has an aromatic ring for obtaining excellent storage stability. Since the anionic polyurethane (A) has an aromatic ring, excellent storage stability can be obtained, even in a case where the acrylonitrile butadiene rubber (B), the aqueous medium (C), the vulcanizing agent (D), and the vulcanizing accelerator (E) are added to the anionic polyurethane (A) and the aqueous medium (C). In a case where an aliphatic anionic polyurethane is used, for example, instead of the anionic polyurethane (A), thickening or solidification may occur over time. The reason for excellent storage stability obtained by the anionic polyurethane (A) having an aromatic ring is as follows, for example. Prevention of aggregation of dispersing elements due to electrostatic repulsion contributes to stable dispersion of the dispersing elements which are dispersed in the aqueous medium (C). In the invention, it is thought that, as a result of an increase in electrostatic repulsion due to an effect of it electrons of the aromatic ring to a charge state of the dispersing elements including the anionic polyurethane (A), the dispersing elements including the anionic polyurethane (A) are hardly aggregated with other components in the aqueous resin composition and the storage stability of the aqueous resin composition is improved.

A content of the aromatic ring in the anionic polyurethane (A) is preferably 550 to 2,500 mmol/kg, more preferably 800 to 2, 400 mmol/kg, and even more preferably 1,000 to 2,300 mmol/kg, from a viewpoint of obtaining excellent storage stability and wear resistance. The content of the aromatic ring in the anionic polyurethane (A) shows the content of the aromatic ring occupying the raw material with respect to a total mass of each raw material configuring the anionic polyurethane (A). In a case of the calculation, a molecular weight of a benzene ring or a naphthalene ring excluding an organic group is used as a molecular weight of the aromatic ring. For example, in a case of toluene, a molecular weight of a benzene ring having five hydrogen atoms excluding one methyl group is used, in a case of diphenylmethane diisocyanate, a molecular weight of a benzene ring having four hydrogen atoms excluding an isocyanate group and a methylene group is used, and in a case of tolylene diisocyanate, a molecular weight of a benzene ring having four hydrogen atoms excluding two methyl groups is used.

Specifically, as the anionic polyurethane (A), a product of reaction of polyol, a carboxyl group-containing glycol, polyisocyanate, and a chain extender can be used.

Examples of polyol include polyoxyalkylene polyol, polyester polyol, polycarbonate polyol, and polyacrylic polyol. These polyols may be used alone or in combination of two or more kinds thereof. Among these, polyoxyalkylene polyol is preferably used, and polyoxytetramethylene glycol is more preferably used, from a viewpoint of obtaining excellent flexibility with high mobility of a polymer chain.

A number average molecular weight of the polyol is preferably 500 to 5,000 and more preferably 700 to 4,000, from viewpoints of manufacturing stability and flexibility. The number average molecular weight of the polyol shows a value measured by gel permeation chromatography (GPC) under the following conditions.

Measurement device: rapid GPC device ("HLC-8220 GPC" manufactured by Tosoh Corporation)

Column: the following columns manufactured by Tosoh Corporation were connected in series and used.

"TSKgel G5000"(7.8 mm I.D.×30 cm)×1 piece

"TSKgel G4000"(7.8 mm I.D.×30 cm)×1 piece

"TSKgel G3000"(7.8 mm I.D.×30 cm)×1 piece

"TSKgel G2000"(7.8 mm I.D.×30 cm)×1 piece

Detector: RI (differential refractometer)
Column temperature: 40° C.
Eluent: tetrahydrofuran (THF)
Flow rate: 1.0 mL/min
Injected amount: 100 μL (tetrahydrofuran solution having a sample concentration of 0.4 mass %)
Reference sample: a calibration curve was drawn by using the following reference polystyrene.
(Reference Polystyrene)
"TSKgel reference polystyrene A-500" manufactured by Tosoh Corporation
"TSKgel reference polystyrene A-1000" manufactured by Tosoh Corporation
"TSKgel reference polystyrene A-2500" manufactured by Tosoh Corporation
"TSKgel reference polystyrene A-5000" manufactured by Tosoh Corporation
"TSKgel reference polystyrene F-1" manufactured by Tosoh Corporation
"TSKgel reference polystyrene F-2" manufactured by Tosoh Corporation
"TSKgel reference polystyrene F-4" manufactured by Tosoh Corporation
"TSKgel reference polystyrene F-10" manufactured by Tosoh Corporation
"TSKgel reference polystyrene F-20" manufactured by Tosoh Corporation
"TSKgel reference polystyrene F-40" manufactured by Tosoh Corporation
"TSKgel reference polystyrene F-80" manufactured by Tosoh Corporation
"TSKgel reference polystyrene F-128" manufactured by Tosoh Corporation
"TSKgel reference polystyrene F-288" manufactured by Tosoh Corporation
"TSKgel reference polystyrene F-550" manufactured by Tosoh Corporation A content of an oxyalkylene group in the anionic polyurethane (A) is preferably 4 to 12 mol/kg, more preferably 5 to 11.5 mol/kg, and even more preferably 6 to 11 mol/kg, from a viewpoint of obtaining excellent wear resistance and flexibility.

The oxyalkylene group is supplied in a case of using polyoxyalkylene polyol as a raw material of the anionic polyurethane (A). Accordingly, the content of the oxyalkylene group in the anionic polyurethane (A) indicates a content of an oxyalkylene group supplied from the polyoxyalkylene polyol with respect to a total mass of each raw material constituting the anionic polyurethane (A).

The carboxyl group-containing glycol gives an anionic group. Examples thereof that may be used include 2,2'-dimethylolpropionic acid, 2,2'-dimethylolbutanoic acid, 2,2'-dimethylolbutyric acid, and 2,2'-valeric acid. These compounds may be used alone or in combination of two or more kinds thereof.

In the aqueous resin composition, a part of or all of the carboxyl group may be neutralized in a basic compound. Examples of the basic compound include organic amine such as ammonia, triethylamine, pyridine, or morpholine; alkanolamine such as monoethanolamine; and a metal basic compound such as sodium, potassium, lithium, or calcium.

Examples of the polyisocyanate include an aromatic polyisocyanate such as phenylene diisocyanate, toluene diisocyanate, diphenylmethane diisocyanate, naphthalene diisocyanate, polymethylene polyphenyl polyisocyanate, or carbodiimidated diphenylmethane polyisocyanate; and an aliphatic or alicyclic polyisocyanate such as hexamethylene diisocyanate, lysine diisocyanate, cyclohexane diisocyanate, isophorone diisocyanate, dicyclohexyl methane diisocyanate, xylylene diisocyanate, tetramethylxylylene diisocyanate, dimer acid diisocyanate, or norbornene diisocyanate. These polyisocyanates may be used alone or in combination of two or more kinds thereof. Among these, the aromatic polyisocyanate is preferably used, from a viewpoint of simply introducing an aromatic ring to the anionic polyurethane (A), and diphenylmethane diisocyanate or toluene diisocyanate is more preferably used, from a viewpoint of forming a hard segment having a suitable chain length to obtain excellent wear resistance and flexibility.

A number average molecular weight of the chain extender is 50 to 450, and examples thereof include a chain extender including an amino group such as ethylenediamine, 1,2-propanediamine, 1,6-hexamethylenediamine, piperazine, 2,5-dimethylpiperazine, isophoronediamine, 1,2-cyclohexanediamine, 1,3-cyclohexanediamine, 1,4-cyclohexanediamine, 4,4'-dicyclohexylmethanediamine, 3,3'-dimethyl-4,4'-dicyclohexylmethanediamine, 1,4-cyclohexanediamine, or hydrazine; and a chain extender including a hydroxyl group such as ethylene glycol, diethylene recycle, triethylene glycol, propylene glycol, dipropylene glycol, 1,3-propanediol, 1,3-butanediol, 1,4-butanediol, hexamethylene glycol, saccharose, methylene glycol, glycerin, sorbitol, bisphenol A, 4,4'-dihydroxydiphenyl, 4,4'-dihydroxydiphenyl ether, or trimethylolpropane. These chain extenders may be used alone or in combination of two or more kinds thereof. Among these, the chain extender including a hydroxyl group is preferably used, from a viewpoint of preventing hardening of a solidified coating film and obtaining excellent wear resistance and flexibility, and one or more kinds of chain extenders selected from the group consisting of ethylene glycol, butanediol, trimethylolpropane, and neopentyl glycol are more preferably used, and ethylene glycol or butanediol is even more preferably used, from a viewpoint of forming a hard segment having a suitable chain length to obtain more excellent wear resistance and flexibility.

As described above, a product of reaction of polyoxytetramethylene glycol, the carboxyl group-containing glycol, diphenylmethane diisocyanate or toluene diisocyanate, and ethylene glycol or butanediol may be used as the anionic polyurethane (A). In this case, excellent wear resistance and flexibility are obtained, in addition to storage stability which is the object of the invention.

The anionic polyurethane (A) can be, for example, prepared by mixing the polyol, the carboxyl group-containing glycol, the polyisocyanate, and the chain extender with each other in the absence of solvents or presence of an organic solvent, and causing a urethanization reaction at a reaction temperature of 50° C. to 100° C. for 3 to 10 hours, for example.

In addition, the anionic polyurethane (A) can also be, for example, prepared by mixing the polyol, the carboxyl group-containing glycol, and the polyisocyanate with each other in the absence of solvents or presence of an organic solvent, causing a reaction at a reaction temperature of 50° C. to 100° C. for 3 to 10 hours, for example, to prepare a urethane prepolymer including an isocyanate group at a molecular terminal, and causing a reaction between the urethane prepolymer and the chain extender.

A [isocyanate group/hydroxyl group] (molar ratio) in the reaction of the polyol, the carboxyl group-containing glycol, the polyisocyanate, and the chain extender is preferably 0.9 to 1.1 and more preferably 0.93 to 1.05.

Examples of the organic solvent which can be used in the preparation of the anionic polyurethane (A) include a ketone solvent such as acetone or methyl ethyl ketone; an ether solvent such as tetrahydrofuran or dioxane; an acetic ester solvent such as ethyl acetate or butyl acetate; a nitrile solvent such as acetonitrile; and an amide solvent such as dimethylformamide or N-methylpyrrolidone. The organic solvent may be used alone or in combination of two or more kinds thereof.

An average particle diameter of the anionic polyurethane (A) is preferably 0.01 to 1 μm and more preferably 0.05 to 0.9 μm, from a viewpoint of easily preventing formation of precipitates. A measurement method of the average particle diameter of the anionic polyurethane (A) is described in examples which will be described later.

A weight average molecular weight of the anionic polyurethane (A) is preferably 10,000 to 1,000,000 and more preferably 30,000 to 500,000, from a viewpoint of obtaining excellent flexibility and wear resistance. The weight average molecular weight of the anionic polyurethane (A) indicates a value obtained by performing the measurement in the same manner as the measurement of the number average molecular weight of the polyol.

A urethane bonding amount in the anionic polyurethane (A) is preferably 500 to 3,500 mmol/kg and more preferably 700 to 3,000 mmol/kg with respect to the entire anionic polyurethane (A), from a viewpoint of obtaining excellent flexibility and wear resistance. The urethane bonding amount in the anionic polyurethane (A) indicates a content of a urethane bonding structure occupying the raw material with respect to a total mass of each raw material constituting the anionic polyurethane (A).

A content of a urea bond in the anionic polyurethane (A) is preferably 0.2 mol/kg and more preferably 0.15 mol/kg, from a viewpoint of preventing hardening of a solidified coating film due to hydrogen bonding and obtaining excellent wear resistance and flexibility.

Examples of the urea bond include a bond generated with a reaction with polyisocyanate in a case of using a chain extender including an amino group as a raw material of the anionic polyurethane (A), and a bond generated with a reaction between an amino group generated with a reaction between an isocyanate group and water, and polyisocyanate. Accordingly, the content of the urea bond in the anionic polyurethane (A) can be adjusted by adjusting the amount of the chain extender including an amino group used and causing urethanization of all of isocyanate before an emulsification operation. The content of the urea bond indicates a value calculated by General Formula (1).

$$\text{Content of urea bond (mol/kg)} = \frac{(\text{mol number of amino group}) + \left( \begin{array}{c} \text{mol number of isocyanate group} - \\ \text{mol number of hydroxyl group} - \\ \text{mol number of amino group} \end{array} \right) \Big/ 2}{\text{mass of polyol} + \text{mass of glycol including carboxyl group} + \text{mass of polyisocyanate} + \text{mass of chain extender}} \quad [\text{Expression 1}]$$

A content of the anionic polyurethane (A) in the aqueous resin composition is preferably 2% to 60% by mass and more preferably 5% to 50% by mass with respect to the aqueous resin composition, from a viewpoint of obtaining excellent storage stability and coating workability.

As the acrylonitrile butadiene rubber (B), well-known acrylonitrile butadiene rubber can be used, and for example, acrylonitrile butadiene rubber in which a content of an acrylonitrile segment is 10% to 70% by mass, and acrylonitrile butadiene rubber in which a content of a butadiene segment is 30% to 90% by mass can be used. In a case of preparing the acrylonitrile butadiene rubber (B), methacrylic acid may be contained as a raw material, if necessary.

A mass ratio (ratio of solid contents) of the anionic polyurethane (A) and the NBR (B) is preferably 5/95 to 95/5 and more preferably 20/80 to 95/5, from a viewpoint of obtaining excellent storage stability.

Examples of the aqueous medium (C) include water, an organic solvent mixed with water, and a mixture of these. Examples of the organic solvent mixed with water include an alcohol solvent such as methanol, ethanol, n-propanol, or isopropanol; a ketone solvent such as acetone or methyl ethyl ketone; a polyalkylene glycol solvent such as ethylene glycol, diethylene glycol, or propylene glycol; an alkyl ether solvent such as polyalkylene polyol; and a lactam solvent such as N-methyl-2-pyrrolidone. Among these, water is preferably used from an environmental viewpoint.

A content of the aqueous medium (C) is preferably 10% to 90% by mass and more preferably 30% to 80% by mass with respect to the aqueous resin composition, from a viewpoint of coating properties.

The vulcanizing agent (D) vulcanizes with a double bond derived from butadiene in the acrylonitrile butadiene rubber (B) and applies durability such as water resistance or oil resistance, and examples thereof include sulfur, morpholine disulfide, and dithiodicaprolactam, alkylphenol disulfide. These compounds may be used alone or in combination of two or more kinds thereof. Among these, sulfur is preferably used from a viewpoint of exhibiting an excellent vulcanizing effect. The vulcanizing agent (D) is preferably used in a state of being dispersed in an aqueous medium such as water.

A content of the vulcanizing agent (D) is preferably 0.2% to 20% by mass and more preferably 0.5% to 10% by mass as a ratio of solid contents, with respect to 100 parts by mass of the acrylonitrile butadiene rubber (B), from a viewpoint of a balance between the vulcanizing effect and storage stability.

The vulcanizing accelerator (E) accelerates the vulcanizing of the vulcanizing agent (D), and examples thereof include a guanidine compound such as diphenylguanidine; a thiuram compound such as tetramethylthiuram disulfide, tetramethylthiurammonosulfide, tetraethylthiuram disulfide, or tetrabutylthiuram disulfide; dithiocarbamate such as zinc dimethyldithiocarbamate or zinc diethyl dithiocarbamate; a thiazole compound such as 2-mercaptobenzothiazole or dibenzothiazyl disulfide; a sulfenamide compound such as N-cyclohexyl-2-benzothiazole sulfenamide, or N-t-butyl-2-benzothiazolesulfenamide; andzincoxide. These compounds may be used alone or in combination of two or more kinds thereof. Among these, zinc oxide and zinc diethyl dithiocarbamate are preferably used, from a viewpoint of a vulcanizing effect of the acrylonitrile butadiene rubber (B) and the vulcanizing agent (D). The vulcanizing accelerator (E) is preferably used in a state of being dispersed in an aqueous medium such as water.

A content of the vulcanizing accelerator (E) is preferably 0.1% to 20% by mass and more preferably 0.3% to 10% by mass as a ratio of solid contents, with respect to 100 parts by mass of the acrylonitrile butadiene rubber (B), from a viewpoint of a balance between the vulcanizing effect of storage stability.

As a preparing method of the aqueous resin composition, for example, a method of preparing an aqueous resin composition by preparing the anionic polyurethane (A) in the absence of solvents or presence of an organic solvent, neutralizing a carboxyl group in the anionic polyurethane (A), if necessary, supplying the aqueous medium (C), dispersing the anionic polyurethane (A) in the aqueous medium (B), and mixing and stirring the NBR (B), the vulcanizing agent (D), and the vulcanizing accelerator (E).

In a case of preparing the aqueous resin composition, an emulsifier may be used, from a viewpoint of improving dispersion stability of the anionic polyurethane (A) in the aqueous medium (C).

Examples of the emulsifier include a nonionic emulsifier such as polyoxyethylene nonyl phenyl ether, polyoxyethylene lauryl ether, polyoxyethylene styryl phenyl ether, polyoxyethylene sorbitol tetraoleate, or a polyoxyethylene-polyoxypropylene copolymer; fatty acid salt such as sodium oleate, an anionic emulsifier such as alkyl sulfate ester salt, alkyl benzene sulfonate salt, alkyl sulfosuccinate salt, naphthalene sulfonate, polyoxyethylene alkyl sulfate, alkane sulfonate sodium salt, or alkyl diphenyl ether sulfone acid sodium salt; and a cationic emulsifier such as alkylamine salt, alkyltrimethylammonium salt, or alkyldimethylbenzylammonium salt. These emulsifiers may be used alone or in combination of two or more kinds thereof.

The aqueous resin composition of the invention includes the anionic polyurethane (A), the NBR (B), the aqueous medium (C), the vulcanizing agent (D), and the vulcanizing accelerator (E), and may include other additives, if necessary.

Examples of the additives include a thickener, a defoaming agent, a urethanization catalyst, a silane coupling agent, a filler, a thixotropic agent, a tackifier, a wax, a heat stabilizer, a light stabilizer, a fluorescent whitening agent, a foaming agent, a pigment, a dye, an antistatic agent, a moisture permeability improver, a water repellent, an oil repellent, a flame retardant, an antiblocking agent, and a hydrolysis inhibitor. These additives may be used alone or in combination of two or more kinds thereof.

The thickener can be suitably used for adjusting viscosity of the aqueous resin composition and easily performing a process with salt coagulation, and examples thereof include a cellulose derivative such as hydroxyethyl cellulose, methyl cellulose, or carboxymethyl cellulose; polyacrylate, polyvinyl pyrrolidone, a urethane compound, and a polyether compound. The amount used in a case of using the thickener is 0.1 to 5 parts by mass with respect to 100 parts by mass of a total of the anionic polyurethane (A) and the acrylonitrile butadiene rubber (B), for example.

Examples of the defoaming agent include defoaming agents such as a silicone compound, a mineral oil compound, a polyglycol ether compound, a fatty acid ester compound, metal soap, and a fluorine compound. These defoaming agents may be used alone or in combination of two or more kinds thereof.

An acid value of the aqueous resin composition is preferably 5 to 19 mgKOH/g and more preferably 7 to 14 mgKOH/g, from a viewpoint of obtaining excellent preparation stability. A measurement method of the acid value of the aqueous resin composition is described in examples which will be described later.

As a method of obtaining a solidified coating film by using the aqueous resin composition of the invention, a method of applying the aqueous resin composition to a surface of a release film and dipping the coated material in a predetermined coagulating agent, and drying the coated material is used, for example.

As a method of applying the aqueous resin composition to a release film and the like, a knife coater method, a spray method, a curtain coater method, a flow coater method, a roll coater method, or a brush coating method is used, for example. In this case, the viscosity of the aqueous resin composition is preferably 50 to 10,000 mPa·s and more preferably 1,000 to 3,000 mPa·s. The viscosity of the aqueous resin composition indicates a value measured by a B type viscometer (40P cone) at 25° C.

Examples of the coagulating agent in which the coating material of the aqueous resin composition is dipped, include a metal salt solution such as calcium nitrate, calcium chloride, zinc nitrate, zinc chloride, magnesium acetate, aluminum sulfate, or sodium chloride; and an acid solution such as formic acid or acetic acid. Examples of the solvent in which metal salt or acid can dissolve, include water, methanol, ethanol, and isopropanol. A content of metal salt included in the coagulating agent is preferably 1% to 50% by mass with respect to a total amount of the coagulating agent. In addition, the time for dipping the coated material in the coagulating agent is preferably 1 to 10 minutes. Further, the coagulating agent is preferably used at a temperature of 5° C. to 60° C.

After the dipping, the coated material is, for example, dried at a temperature of 50° C. to 150° C. for 1 minute to 1 hour, and a coating film solidified on a surface of a release film is formed.

A 100% modulus of the solidified coating film obtained by a tensile test under the condition of a cross head speed of 300 mm/min is preferably equal to or smaller than 6 MPa and more preferably 0.1 to 4 MPa, from a viewpoint of excellent flexibility.

In addition, a 300% modulus of the solidified coating film obtained by a tensile test under the condition of a cross head speed of 300 mm/min is preferably equal to or smaller than 14 MPa and more preferably 0.1 to 12 MPa, from a viewpoint of excellent flexibility.

In a case of manufacturing a glove by using the solidified coating film, first, a glove mold or a tube mold is dipped in the coagulating agent and dried, if necessary, and metal salt or the like in the coagulating agent is attached to the surface of the glove mold or the like. Then, the glove mold is dipped in the aqueous resin composition, the surface thereof is washed with water and dried, and a coating film solidified on the surface of the glove mold or the like is formed. After that, the solidified coating film is released from the glove mold or the like, and accordingly, a glove including the solidified coating film having a shape according to the glove mold or the like can be obtained. Even in a case of manufacturing the tube, the tube can be manufactured by the same method as described above, except for using the tube mold.

In a case of being dipped in the coagulating agent, the glove mold or the tube mold may be at room temperature or may be heated to, for example, 30° C. to 70° C. In addition, the coagulating agent may also be at room temperature in the same manner as in a case of the glove mold, and in a case where the glove mold is heated, the coagulating agent may be heated to, for example, 30° C. to 70° C.

In addition, a glove-shaped material or a tube-shaped material formed of a knitted item such as a nylon fiber may be mounted to the glove mold or the tube mold, in advance. Specifically, first, the glove mold, on which the glove-shaped material formed of the knitted item is mounted, is dipped in the coagulating agent and dried, if necessary, and accordingly, the glove-shaped material is impregnated with the coagulating agent. Then, the glove mold or the like is dipped in the aqueous resin composition, the surface thereof is washed with water and dried, a glove or the like formed of a solidified coating film is formed on a surface of the glove-shaped material, the glove or the like is released from the glove mold and the glove-shaped material, and accordingly, a glove or the like formed of the solidified coating film having a shape according to the glove or the like can be obtained. Even in a case of manufacturing the tube, the tube can be manufactured by the same method as described above, except for using the tube mold and the tube-shaped material formed of the knitted item such as a nylon fiber.

The knitted item is not limited to the nylon fiber, and a knitted item formed of a polyester fiber, an aramid fiber, or cotton can be used. In addition, a fabric formed of the fiber can also be used, instead of the knitted item. Further, a glove-shaped material or a tube-shaped material formed of a resin material such as vinyl chloride, natural rubber, or synthetic rubber can also be used, instead of the knitted item.

The number of times of friction of the glove performed based on EN388:2004 is preferably equal to or greater than 2,000 times, more preferably equal to or greater than 5,000 times, and even more preferably 8,000 times to 50,000 times, from a viewpoint of excellent wear resistance.

As described above, the glove of the invention has excellent wear resistance and flexibility, and thus, can be suitably used in various fields such as a chemical industry field or a food field.

EXAMPLES

Hereinafter, the invention will be described more specifically with reference to examples.

Preparation Example 1

Preparation of Aqueous Urethane Composition (X-1)

In a nitrogen-purged vessel equipped with a thermometer, nitrogen gas, an introduction tube, and a stirrer, 895.3 parts by mass of the polyoxytetramethylene glycol (number average molecular weight; 2,000, hereinafter abbreviated as "PTMG 2000"), 18 parts by mass of ethylene glycol (hereinafter, abbreviated as "EG"), 25.5 parts by mass of 2,2'-dimethylolpropionic acid (hereinafter, abbreviated as "DMPA"), and 224 parts by mass of diphenylmethane diisocyanate (hereinafter, abbreviated as "MDI") were allowed to react at 70° C. in the presence of 487 parts by mass of methyl ethyl ketone.

At the time when the viscosity of the reaction product reached a specified viscosity, 2.9 parts by mass of methanol was added, and then the mixture was stirred for 1 hour to complete the reaction. In addition, 1,257 parts by mass of methyl ethyl ketone was added as a dilution solvent, and accordingly, an organic solvent solution of anionic polyurethane was obtained.

Then, 19.2 parts by mass of triethyl amine was added to the organic solvent solution of anionic polyurethane as a neutralizer and stirred, 3,638 parts by mass of water was further added and stirred, and accordingly, a water dispersion of anionic polyurethane was obtained. Next, this water dispersion was subjected to solvent removal, and accordingly, an aqueous urethane composition (X-1) having a content of a non-volatile component of 40% by mass and an acid value of 9.2 mgKOH/g was obtained. Regarding the anionic polyurethane, a content of an oxyalkylene group was 10.7 mol/kg, a content of an aromatic ring was 1,300 mmol/kg, and an average particle diameter was 0.25 μm.

Preparation Example 2

Preparation of Aqueous Urethane Composition (X-2)

In a nitrogen-purged vessel equipped with a thermometer, nitrogen gas, an introduction tube, and a stirrer, 764.5 parts by mass of PTMG 2000, 18.9 parts by mass of butanediol (hereinafter, abbreviated as "BG"), 23.1 parts by mass of DMPA, and 190.8 parts by mass of MDI were allowed to react at 70° C. in the presence of 417.5 parts by mass of methyl ethyl ketone.

At the time when the viscosity of the reaction product reached a specific viscosity, 2.5 parts by mass of methanol was added, and then the mixture was stirred for 1 hour to complete the reaction. In addition, 1,078.4 parts by mass of methyl ethyl ketone was added as a dilution solvent, and accordingly, an organic solvent solution of anionic polyurethane was obtained.

Then, 17.4 parts by mass of triethyl amine was added to the organic solvent solution of anionic polyurethane as a neutralizer and stirred, 3,200 parts by mass of water was further added and stirred, and accordingly, a water dispersion of anionic polyurethane was obtained. Next, this water dispersion was subjected to solvent removal, and accordingly, an aqueous urethane composition (X-2) having a content of a non-volatile component of 40% by mass and an acid value of 9.7 mgKOH/g was obtained. Regarding the anionic polyurethane, a content of an oxyalkylene group was 10.6 mol/kg, a content of an aromatic ring was 1,290 mmol/kg, and an average particle diameter was 0.14 μm.

Preparation Example 3

Preparation of Aqueous Urethane Composition (X-3)

In a nitrogen-purged vessel equipped with a thermometer, nitrogen gas, an introduction tube, and a stirrer, 354.3 parts by mass of polyoxytetramethylene glycol (number average molecular weight; 700, hereinafter abbreviated as "PTMG 700"), 8.6 parts by mass of EG, 16.7 parts by mass of DMPA, and 190.8 parts by mass of MDI were allowed to react at 70° C. in the presence of 237.3 parts by mass of methyl ethyl ketone.

At the time when the viscosity of the reaction product reached a specific viscosity, 2.7 parts by mass of methanol was added, and then the mixture was stirred for 1 hour to complete the reaction. In addition, 618 parts by mass of methyl ethyl ketone was added as a dilution solvent, and accordingly, an organic solvent solution of anionic polyurethane was obtained.

Then, 12.6 parts by mass of triethyl amine was added to the organic solvent solution of anionic polyurethane as a neutralizer and stirred, 1,785 parts by mass of water was further added and stirred, and accordingly, a water dispersion of anionic polyurethane was obtained. Next, this water dispersion was subjected to solvent removal, and accordingly, an aqueous urethane composition (X-3) having a content of a non-volatile component of 40% by mass and an acid value of 12.3 mgKOH/g was obtained. Regarding the anionic polyurethane, a content of an oxyalkylene group was 8.6 mol/kg, a content of an aromatic ring was 2,260 mmol/kg, and an average particle diameter was 0.39 µm.

Preparation Example 4

Preparation of Aqueous Urethane Composition (X-4)

In a nitrogen-purged vessel equipped with a thermometer, nitrogen gas, an introduction tube, and a stirrer, 1,127.3 parts by mass of polyoxytetramethylene glycol (number average molecular weight; 4,000, hereinafter, abbreviated as "PTMG 4000"), 10.3 parts by mass of EG, 44.5 parts by mass of DMPA, and 190.8 parts by mass of MDI were allowed to react at 70° C. in the presence of 569 parts by mass of methyl ethyl ketone.

At the time when the viscosity of the reaction product reached a specific viscosity, 2.6 parts by mass of methanol was added, and then the mixture was stirred for 1 hour to complete the reaction. In addition, 1,490 parts by mass of methyl ethyl ketone was added as a dilution solvent, and accordingly, an organic solvent solution of anionic polyurethane was obtained.

Then, 33.5 parts by mass of triethyl amine was added to the organic solvent solution of anionic polyurethane as a neutralizer and stirred, 4,293 parts by mass of water was further added and stirred, and accordingly, a water dispersion of anionic polyurethane was obtained. Next, this water dispersion was subjected to solvent removal, and accordingly, an aqueous urethane composition (X-4) having a content of a non-volatile component of 40% by mass and an acid value of 13.5 mgKOH/g was obtained. Regarding the anionic polyurethane, a content of an oxyalkylene group was 11.4 mol/kg, a content of an aromatic ring was 940 mmol/kg, and an average particle diameter was 0.43 µm.

Preparation Example 5

Preparation of Aqueous Urethane Composition (X-5)

In a nitrogen-purged vessel equipped with a thermometer, nitrogen gas, an introduction tube, and a stirrer, 391.1 parts by mass of PTMG 2000, 26.7 parts by mass of EG, 15.7 parts by mass of DMPA, and 190.8 parts by mass of MDI were allowed to react at 70° C. in the presence of 261 parts by mass of methyl ethyl ketone.

At the time when the viscosity of the reaction product reached a specific viscosity, 2.1 parts by mass of methanol was added, and then the mixture was stirred for 1 hour to complete the reaction. In addition, 675.6 parts by mass of methyl ethyl ketone was added as a dilution solvent, and accordingly, an organic solvent solution of anionic polyurethane was obtained.

Then, 11.8 parts by mass of triethyl amine was added to the organic solvent solution of anionic polyurethane as a neutralizer and stirred, 1,953.4 parts by mass of water was further added and stirred, and accordingly, a water dispersion of anionic polyurethane was obtained. Next, this water dispersion was subjected to solvent removal, and accordingly, an aqueous urethane composition (X-5) having a content of a non-volatile component of 40% by mass and an acid value of 10.5 mgKOH/g was obtained. Regarding the anionic polyurethane, a content of an oxyalkylene group was 8.7 mol/kg, a content of an aromatic ring was 2,070 mmol/kg, and an average particle diameter was 0.42 µm.

Preparation Example 6

Preparation of Aqueous Urethane Composition (X-6)

In a nitrogen-purged vessel equipped with a thermometer, nitrogen gas, an introduction tube, and a stirrer, 1,151 parts by mass of PTMG 2000, 17.8 parts by mass of EG, 42.4 parts by mass of DMPA, and 200 parts by mass of toluene diisocyanate (hereinafter, abbreviated as "TDI") were allowed to react at 70° C. in the presence of 586.6 parts by mass of methyl ethyl ketone.

At the time when the viscosity of the reaction product reached a specific viscosity, 3.9 parts by mass of methanol was added, and then the mixture was stirred for 1 hour to complete the reaction. In addition, 1,530.3 parts by mass of methyl ethyl ketone was added as a dilution solvent, and accordingly, an organic solvent solution of anionic polyurethane was obtained.

Then, 32 parts by mass of triethyl amine was added to the organic solvent solution of anionic polyurethane as a neutralizer and stirred, 4,415 parts by mass of water was further added and stirred, and accordingly, a water dispersion of anionic polyurethane was obtained. Next, this water dispersion was subjected to solvent removal, and accordingly, an aqueous urethane composition (X-7) having a content of a non-volatile component of 40% by mass and an acid value of 12.6 mgKOH/g was obtained. Regarding the anionic polyurethane, a content of an oxyalkylene group was 11.3 mol/kg, a content of an aromatic ring was 960 mmol/kg, and an average particle diameter was 0.19 µm.

Preparation Example 7

Preparation of Acrylonitrile Butadiene Rubber Composition (B-1)

On the basis of 100 parts by mass of the monomer, 145 parts of ion exchanged water was mixed with 0.05 parts by mass of ethylenediaminetetraacetic acid, 0.25 parts by mass of sodium salt of condensed naphthalenesulfonic acid, 1.5 parts by mass of sodium dodecylbenzenesulfonate, and 0.6 parts by mass of t-dodecyl mercaptan, and further mixed with 60% butadiene, 35% acrylonitrile, and 5% methacrylic acid in a reactor equipped with a stirring mixer. The mixture was heated to 45° C., 0.05 parts by mass of a potassium persulfate catalyst was injected, and emulsion polymerization was performed. In a case where a highest polymerization temperature reached 65° C. and a conversion rate of a polymer from the monomer reached 90% to 92%, the polymerization was stopped with ammonia. The cooling was performed to an atmosphere temperature and pH was further adjusted to 7.2 to 7.5 with ammonia. Then, stripping was performed, and condensation was performed until the content of the non-volatile component becomes 44%. An acrylonitrile butadiene rubber composition (B-1) of carboxylated acrylonitrile-butadiene copolymer having the content of the non-volatile component 44% by mass and the pH of 8.2 was obtained.

Comparative Preparation Example 1

Preparation of Aqueous Urethane Composition (X'-1)

In a nitrogen-purged vessel equipped with a thermometer, nitrogen gas, an introduction tube, and a stirrer, 735 parts by mass of PTMG 2000, 31.5 parts by mass of DMPA, and 205.8 parts by mass of dicyclohexylmethane-4,4'-diisocyanate (hereinafter, abbreviated as "$H_{12}MDI$") were allowed to react at 70° C. for 4 hours in the presence of 243 parts by mass of methyl ethyl ketone and 0.2 parts by mass of dioctyltin dilaurate.

Then, 729 parts by mass of methyl ethyl ketone was added and stirred for 1 hour, and an organic solvent solution of anionic polyurethane was obtained.

Then, 23.8 parts by mass of triethyl amine was added to the organic solvent solution of anionic polyurethane as a neutralizer and stirred, 2,917 parts by mass of water was further added and stirred, 29 parts by mass of isophorone diamine (hereinafter, abbreviated as "IPDA") was added and stirred, accordingly, a water dispersion of anionic polyurethane was obtained. Next, this water dispersion was subjected to solvent removal, and accordingly, an aqueous urethane composition (X'-1) having a content of solid contents of 33% by mass was obtained. Regarding the anionic polyurethane, a content of an oxyalkylene group was 10.2 mol/kg, a content of an aromatic ring was 0 mol/kg, and an average particle diameter was 0.25 μm.

Comparative Preparation Example 2

Preparation of Aqueous Urethane Composition (X'-2)

In a nitrogen-purged vessel equipped with a thermometer, nitrogen gas, an introduction tube, and a stirrer, 805 parts by mass of PTMG 2000, 34.5 parts by mass of DMPA, and 144.6 parts by mass of hexamethylene diisocyanate (hereinafter, abbreviated as "HDI") were allowed to react at 70° C. for 4 hours in the presence of 246 parts by mass of methyl ethyl ketone and 0.2 parts by mass of dioctyltin dilaurate.

Then, 738 parts by mass of methyl ethyl ketone was added and stirred for 1 hour, and an organic solvent solution of anionic polyurethane was obtained.

Then, 26.0 parts by mass of triethyl amine was added to the organic solvent solution of anionic polyurethane as a neutralizer and stirred, 2,952 parts by mass of water was further added and stirred, 32 parts by mass of the IPDA was added and stirred, accordingly, a water dispersion of anionic polyurethane was obtained. Next, this water dispersion was subjected to solvent removal, and accordingly, an aqueous urethane composition (X'-2) having a content of solid contents of 30% by mass was obtained. Regarding the anionic polyurethane, a content of an oxyalkylene group was 10.2 mol/kg, a content of an aromatic ring was 0 mol/kg, and an average particle diameter was 0.20 μm.

Example 1

The aqueous urethane composition (X-1) and the acrylonitrile butadiene rubber composition (B-1) were mixed with each other with mixing amounts shown in Table 1, and the pH was adjusted to 8.5 to 9 with an aqueous potassium hydroxide solution. Then, sulfur, zinc oxide, and zinc diethyl dithiocarbamate were mixed with each other with mixing amounts shown in Table 1, and an aqueous resin composition was obtained.

Examples 2 to 7 and Comparative Examples 1 and 2

An aqueous resin composition was obtained in the same manner as in Example 1, except that the kinds and/or the amounts of the aqueous urethane composition, the acrylonitrile butadiene rubber composition, sulfur, zinc oxide, and zinc diethyl dithiocarbamate used were changed as those shown in Tables 1 and 2.

[Evaluation Method of Storage Stability]

In the examples and the comparative examples, the time point when the aqueous resin composition was prepared was set as a reference point, and fluidity of mixed solution after 1, 6, and 24 hours was visually confirmed and evaluated as follows.

"A": fluidity was confirmed even after the lapse of 24 hours.

"B": fluidity was not observed between the time point after the lapse of 6 hours and the time point before the lapse of 24 hours.

"C": fluidity was not observed between the time point after the lapse of 1 hour and the time point before the lapse of 6 hours.

"D": fluidity was not observed until the lapse of 1 hour.

[Measurement Method of Average Particle Diameter of Anionic Polyurethane (A)]

An average particle diameter of the aqueous urethane composition obtained in the synthesis examples, in a case where a relative refractive index was 1.10 and a particle diameter base was the area, was measured by using a laser diffraction/scattering particle size distribution measuring device ("LA-910" manufactured by Horiba, Ltd.) and by using water as dispersion liquid.

[Measurement Method of Acid Value of Aqueous Resin Composition]

The aqueous resin composition obtained in the examples and the comparative examples was dried, 0.05 g to 0.5 g of the dried and solidified resin particles were weighed in 300 mL conical flask, approximately 80 mL of a mixed solvent having a mass ratio of tetrahydrofuran and ion exchange water [tetrahydrofuran/ion exchange water] of 80/20, and a mixed solution thereof was obtained.

Then, a phenolphthalein indicator was mixed with the mixed solution, titration was performed with 0.1 mol/L of potassium hydroxide aqueous solution standardized in advance, and an acid value (mgKOH/g) of the aqueous resin composition was obtained from the amount of the potassium hydroxide aqueous solution used for the titration according to Calculation Expression (1).

Calculation Expression $A=(B \times f \times 5.611)/s$    (1)

In the expression, A represents an acid value (mgKOH/g) of the solid contents of the resin, B represents the amount (mL) of 0.1 mol/L of potassium hydroxide aqueous solution used for the titration, f represents a factor of 0.1 mol/L of potassium hydroxide aqueous solution, S represents a mass (g) of the resin particles, and 5.611 represents a formula weight (56.11/10) of potassium hydroxide.

[Evaluation Method of Flexibility]

An associative thickener "HYDRAN ASSISTER T10" (manufactured by DIC Corporation) was mixed with 100 parts by mass of the aqueous resin composition obtained in the examples and the comparative examples, the viscosity of the mixture thereof was adjusted to become 5,000 to 3,000 mPa·s, and the mixture was applied to a surface of a polypropylene film at room temperature subjected to release treatment by a knife coater method to have a density of 150 g/cm$^2$.

The coated material was dipped in a calcium nitrate aqueous solution at room temperature having a concentration adjusted to 20% by mass for 3 minutes, and then dipped in water for 18 hours. Then, the coated material was dried in an environment of 70° C. for 20 minutes, and then dried in an environment of 120° C. for 2 minutes, and accordingly, a solidified coating film was formed on the surface of the polypropylene film. After the drying, the solidified coating film was peeled off from the surface of the polypropylene film, and accordingly, a solidified coating film having a thickness of 50 μm was obtained.

The obtained solidified coating film was set as a test piece cut to have a length of 100 mm and a width of 5 mm. Both end portions of this test sample were sandwiched with a chuck and pulled by using a tensile tester "Autograph AG-I" (manufactured by Shimadzu Corporation) in an environment of a temperature of 23° C. and humidity of 60%, at a cross head speed of 300 mm/min, and a 100% modulus and a 300% modulus (MPa) of the test piece were measured. A gauge length in this case was 20 mm and an initial distance between chucks was 20 mm.

The flexibility was evaluated from the obtained 100% modulus value and 300% modulus value as follows.

"A": the 100% modulus was 6 MPa and the 300% modulus was 14 MPa.

"B": the standard was not satisfied.

[Evaluation Method of Wear Resistance]

A knitted glove formed of a nylon fiber was mounted on a glove mold and dipped into a calcium nitrate aqueous solution at room temperature having a concentration adjusted to 5% by mass for 10 seconds and pulled out therefrom, and the glove mold was dried at room temperature for 4 minutes. Then, the glove mold was dipped into the aqueous resin composition obtained in the examples and the comparative examples for 2 seconds, a solidified coating film was formed on the surface of the knitted glove, and the glove mold was pulled out, and dried at room temperature for 10 minutes. Next, the glove mold was dipped into water for 180 minutes and pulled out. In addition, the glove mold was dried in an environment of 70° C. for 20 minutes and further dried in an environment of 120° C. for 30 minutes, the knitted glove was extracted from the glove mold, and a glove coated with the solidified coating film was obtained.

A friction test regarding a portion of the palm of the obtained glove was performed based on EN388:2004 by using a Martindale friction tester manufactured by manufactured by Intec Co., Ltd. and the evaluation was performed as follows.

"A": the number of times of friction is equal to or greater than 5,000 times

"B": the number of times of friction is equal to or greater than 2,000 times and smaller than 5,000 times "C": the number of times of friction is smaller than 2,000.

TABLE 1

|  | Example 1 | Example 2 | Example 3 | Example 4 | Example 5 | Example 6 |
|---|---|---|---|---|---|---|
| Anionic polyurethane (A) | (X-1) | (X-2) | (X-3) | (X-4) | (X-5) | (X-6) |
| Composition | PTMG2000 | PTMG2000 | PTMG700 | PTMG4000 | PTMG2000 | PTMG2000 |
|  | DMPA | DMPA | DMPA | DMPA | DMPA | DMPA |
|  | EG | BG | EG | EG | EG | EG |
|  | MDI | MDI | MDI | MDI | MDI | TDI |
| Mixed amount (parts by mass) (solid content conversion) | 20 | 20 | 20 | 20 | 20 | 20 |
| NBR(B) | (B-1) | (B-1) | (B-1) | (B-1) | (B-1) | (B-1) |
| Mixed amount (parts by mass) (solid content conversion) | 80 | 80 | 80 | 80 | 80 | 80 |
| Aqueous medium (C) | Water | Water | Water | Water | Water | Water |
| Vulcanizing agent (D) | Sulfur | Sulfur | Sulfur | Sulfur | Sulfur | Sulfur |
| Mixed amount (parts by mass) | 1.2 | 1.2 | 1.2 | 1.2 | 1.2 | 1.2 |
| Vulcanizing accelerator (E) |  |  |  |  |  |  |
| (1) Kind | Zinc oxide | Zinc oxide | Zinc oxide | Zinc oxide | Zinc oxide | Zinc oxide |
| Mixed amount (parts by mass) | 0.8 | 0.8 | 0.8 | 0.8 | 0.8 | 0.8 |
| (2) Kind | D-Zn | D-Zn | D-Zn | D-Zn | D-Zn | D-Zn |
| Mixed amount (parts by mass) | 0.4 | 0.4 | 0.4 | 0.4 | 0.4 | 0.4 |
| Storage stability | A | A | A | A | A | A |
| Evaluation of wear resistance | A | A | A | B | A | B |
| Evaluation of flexibility | A | A | A | A | A | A |

TABLE 2

|  | Example 7 | Example 8 | Example 9 | Comparative Example 1 | Comparative Example 2 |
|---|---|---|---|---|---|
| Anionic polyurethane (A) | (X-1) | (X-1) | (X-1) | (X'-1) | (X'-2) |
| Composition | PTMG2000 | PTMG2000 | PTMG2000 | PTMG2000 | PTMG2000 |
|  | DMPA | DMPA | DMPA | DMPA | DMPA |
|  | EG | EG | EG | IPDA | IPDA |
|  | MDI | MDI | MDI | H$_{12}$MDI | HDI |

TABLE 2-continued

|  | Example 7 | Example 8 | Example 9 | Comparative Example 1 | Comparative Example 2 |
|---|---|---|---|---|---|
| Mixed amount (parts by mass) (solid content conversion) | 80 | 20 | 20 | 20 | 20 |
| NBR(B) | (B-1) | (B-1) | (B-1) | (B-1) | (B-1) |
| Mixed amount (parts by mass) (solid content conversion) | 20 | 80 | 80 | 80 | 80 |
| Aqueous medium (C) | Water | Water | Water | Water | Water |
| Vulcanizing agent (D) | Sulfur | Sulfur | Sulfur | Sulfur | Sulfur |
| Mixed amount (parts by mass) | 0.3 | 4.8 | 1.2 | 1.2 | 1.2 |
| Vulcanizing accelerator (E) |  |  |  |  |  |
| (1) Kind | Zinc oxide | Zinc oxide | Zinc oxide | Zinc oxide | Zinc oxide |
| Mixed amount (parts by mass) | 0.2 | 0.8 | 2.4 | 0.8 | 0.8 |
| (2) Kind | D-Zn | D-Zn | D-Zn | D-Zn | D-Zn |
| Mixed amount (parts by mass) | 0.1 | 0.4 | 0.8 | 0.4 | 0.4 |
| Storage stability | A | A | A | B | B |
| Evaluation of wear resistance | A | A | A | A | A |
| Evaluation of flexibility | A | A | A | B | B |

It was found that the aqueous resin composition of the invention had excellent storage stability. In addition, it was found that the solidified coating film obtained using the aqueous resin compositions of Examples 1 to 9 had excellent wear resistance and flexibility.

Meanwhile, in Comparative Examples 1 and 2, the aliphatic anionic polyurethane was used instead of the anionic polyurethane (A), and the storage stability was deteriorated.

The invention claimed is:

1. An aqueous resin composition comprising:
   an anionic polyurethane (A) having an aromatic ring;
   an acrylonitrile butadiene rubber (B);
   an aqueous medium (C);
   a vulcanizing agent (D), wherein the vulcanizing agent (D) is sulfur; and
   a vulcanizing accelerator (E), wherein the vulcanizing accelerator (E) is zinc oxide and zinc diethyl dithiocarbamate.

2. The aqueous resin composition according to claim 1, wherein the anionic polyurethane (A) is produced with an aromatic polyisocyanate as a raw material.

3. The aqueous resin composition according to claim 1, wherein the anionic polyurethane (A) is a product of reaction of polyoxytetramethylene glycol, a carboxyl group-containing glycol, diphenylmethane diisocyanate or toluene diisocyanate, and ethylene glycol or butanediol.

4. A glove comprising:
   a coating film produced by solidifying the aqueous resin composition according to claim 1.

5. The aqueous resin composition according to claim 2, wherein the anionic polyurethane (A) is a product of reaction of polyoxytetramethylene glycol, a carboxyl group-containing glycol, diphenylmethane diisocyanate or toluene diisocyanate, and ethylene glycol or butanediol.

6. A glove comprising:
   a coating film produced by solidifying the aqueous resin composition according to claim 2.

7. A glove comprising:
   a coating film produced by solidifying the aqueous resin composition according to claim 3.

* * * * *